April 22, 1958  R. GROSS  2,831,721
AUTOMATIC PARACHUTE RELEASE
Filed April 8, 1955
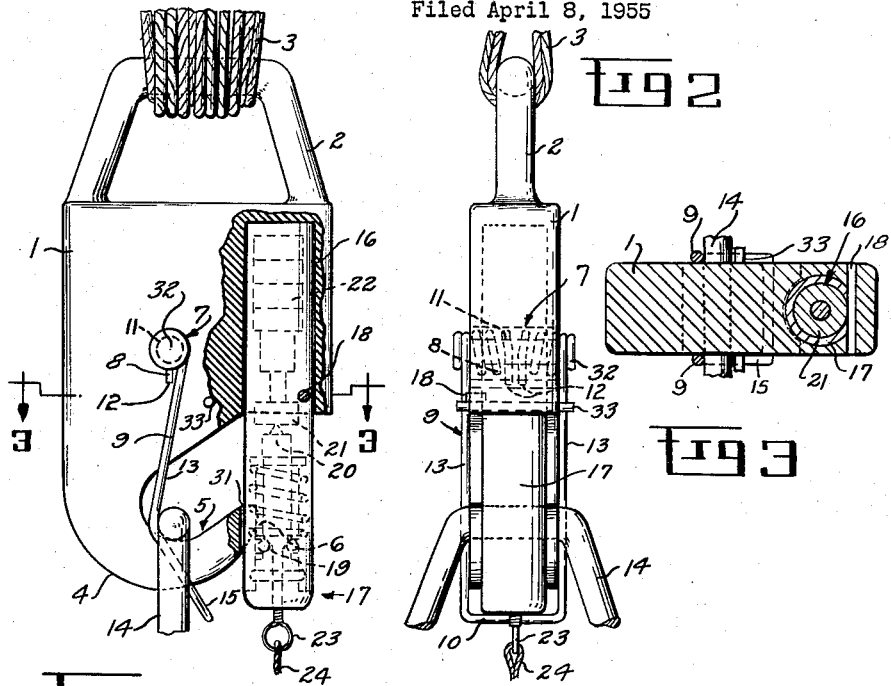
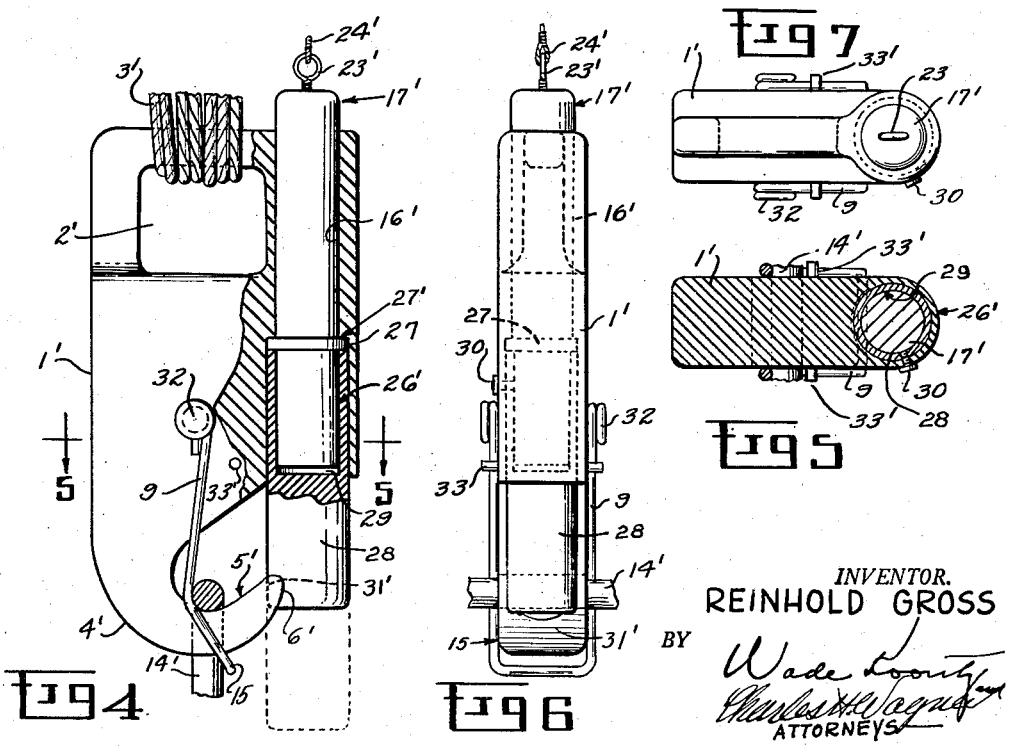
INVENTOR.
REINHOLD GROSS
BY
ATTORNEYS United States Patent Office 2,831,721
Patented Apr. 22, 1958

2,831,721

AUTOMATIC PARACHUTE RELEASE

Reinhold Gross, Dayton, Ohio, assignor to the United States of America as represented by the Secretary of the Air Force Application April 8, 1955, Serial No. 500,314

6 Claims. (Cl. 294—83)

(Granted under Title 35, U. S. Code (1952), sec. 266)

The invention described herein may be manufactured and used by or for the United States Government for governmental purposes without payment to me of any royalty thereon.

This invention relates to automatic parachute load release devices in which a connector means attachable in the parachute to load connection automatically releases the load from the parachute upon the load coming in contact with the earth, and more particularly to an improvement in a delayed action means which prevents inadvertent disconnection of the load from the parachute for a predetermined time interval during the deployment and the initial descent. The present invention is an improvement over an invention of Mark Hattan, patented November 22, 1949, Patent No. 2,488,537. In use, the Hattan invention has proven objectable because the plunger forming the mouth closing means for a hook has a tendency to stick due to dirt or grease or moisture between the walls of plunger and its socket thereby rendering the release mechanism inoperative. The present invention provides a connector body attachable in the parachute to load connection, the upper part of this connector body being fastened to the ring at the lower ends of the shroud lines of the parachute and its lower part containing a hook portion for engaging a link or ring to which the load is attached. Spring means are disposed on the opposite sides of this body which bear against the load carrying link to urge and eject it from the hook, but are prevented from doing so as long as the parachute is sustaining the load, because the tension between the hook and load link holds the link at the inner end of the hook opening due to the incline. When the load contacts the ground this tension is relieved and the load carrying link is ejected from the hook by the spring, disconnecting the parachute from the load.

The hook has a delayed action mouth opening means or pin that prevents inadvertent disconnection between the load and parachute for a predetermined time interval during the deployment of the parachute and the initial descent. These means utilize a "T-2" explosive device which is disclosed in detail in one of its forms in Reinhold Gross' patent dated January 5, 1954, No. 2,665,163 (Fig. 6). The "T-2" device consists, in essence, of a cylindrical shell containing in the named order, a trigger mechanism, a primer, a powder train, and an explosive charge.

This device is longitudinally disposed in the connector body so as to block the mouth of the hook directly or through an additional element. When the parachute opens the trigger is pulled and the powder train ignited. This provides a time delay before the explosive charge is set off. When the explosive charge goes off, the "T-2" device is blown from, or ejects the obstruction out of the hook opening to open the hook opening so that the load link can be ejected from the hook by the ejection spring upon the load engaging and being partly supported by the ground.

The advantage of the present invention over Hattan's patent is that it provides a positive uniform time delayed action means for the prevention of inadvertent disconnection of the load from the parachute for a predetermined period of time and then causes quick and positive opening of the hook after the load is stabilized eliminating the possibility that the hook closure will stick or jam, or freeze due to moisture, or lubricant in cold atmosphere and fail to open and prevent the parachute from disengaging the load upon the load reaching the ground, as might be the case where the gravity operated mouth closing means or pin employed in the Hattan patent would stick and fail.

This and other objects and advantages will become more apparent to those skilled in the art, as the description proceeds, when considered in conjunction with the accompanying drawings and description in which like reference characters refer to like parts in the several figures.

Drawings

Figure 1 is a side elevation, partly broken away and shown in section of my improved release device illustrating how the shroud lines of the parachute are attached to the top of the device, also showing how the link or ring attached to the load hooks into the release device and how the delayed action hook entrance closing means blocks the mouth of the hook.

Figure 2 is a front elevation of the device as shown in Figure 1.

Figure 3 is a transverse sectional view of the device shown in Figure 1 taken approximately on the plane indicated by line 3—3 in Figure 1 and looking in the direction of the arrows.

Figure 4 is a side elevation, partly broken away and shown in section of a modification of the invention shown in Figures 1, 2 and 3.

Figure 5 is a sectional view taken approximately on the plane indicated by line 5—5 of Figure 4 looking in the direction of the arrows.

Figure 6 is a front elevation of the device shown in Figure 4.

Figure 7 is a top plan view of the device shown in Figures 4, 5 and 6.

Referring now to Figures 1 and 2, a connector body 1 is provided on the upper end of which is a bail or D ring 2 which provides a connection between the connector body 1 and the shroud lines 3 of a parachute (not shown). The lower part of this connector body 1 is formed with a hook 4 having the base of its bight portion or opening 5 substantially close to the longitudinal vertical centerline of the connector body 1 and having a portion of the inside lower surface of the hook opening inclined forwardly upward approximately 30° from the horizontal from the bight portion 5 to the outer edge or tip of the hook. This hook engages a link or ring 14 to which the supporting lines (not shown) to the load (not shown) are connected.

A coil spring receiving bore 7 extends through the body 1 and is formed with a channel or slot 8 at its bottom extending across the body radially from the bore 7 for the length of the bore 7. An ejector spring 9 has a U-shaped middle portion 10 with its end portions formed into spring coils 11 wound toward each other, terminating in radially projecting ends 12 seated in the channel 8.

The two coils 11 slid into the bore 7 from the opposite sides of the connector body 1 with their outstanding ends 12 fitted into the channel 8 to anchor the spring. A rivet 32 extends through the spring with heads of the rivet engaging the sides of the spring to retain the spring coils in the bore. The recited construction biases the ejector spring 9 so that the sides of the U-shaped vertical portions 13 will sweep across the bight portion 5 of the hook 4 to the outer edge of the hook, thereby urging the load link 14 from the hook. The outer vertical portions 13 of the spring 9 have slightly upturned or laterally bent portions 15 which tends to displace the load link 14 out of the bight portion 5 of the hook 4 and tends to reduce frictional drag on the inclined surface of the bight when the pull of the load is eliminated or materially reduced and the spring 9 ejects the load link 14 from the hook 4. Stops 33 are provided on the side faces of the connector body 1 projecting into the path of the U-shaped portion 13 of the spring after the ring 14 is ejected from the hook, when the load supported by the ring 14 engages the ground.

A portion of the connector body 1 above the hook portion is provided with a substantially vertical blind bore 16, which is positioned directly above the outer edge 6 of the hook 4. Into this bore 16, is slidably fitted a cylindrical detent member generally indicated by the numeral 17, this member extending downwardly across the mouth of the hook 4 to prevent the unhooking of the load link 14. The outer edge 6 of the hook 4 is provided with a vertical groove 31 having a curvature and space to provide clearance for outward projection of the member 17, the detent element 17 being locked in place by a shear pin 18 as seen in Figure 3.

The cylindrical detent member 17 comprises a "T-2" time delay explosive actuator which, as indicated previously is a conventional device is employed as a time delay means for positively opening the hook. It contains within its cylindrical shell, in the named order, a trigger mechanism 19, a firing pin 20, a primer 21, and a series of "slow" burning powder charges 22 which constitute the equivalent of a powder train and an explosive charge. The trigger mechanism 19 has an actuating pull wire extending to the outside of the explosive actuator 17, this wire being provided with a loop 23 to which one end of a pull cord 24 is fastened, the other end being close connected to the load.

In operation, the action of the release mechanism is as follows: the connector body 1 forms a releasable link between the parachute and its supported load. The D ring or bail 2 of the connector body 1 connects the shroud lines 3 of the parachute and the hook 4 of the connector body 1 and the hook link 14 to which the load is connected, detachably connects the load to the hook. Initially, the load link 14 is prevented from leaving the hook opening because of the hook-mouth closing means comprising the explosive actuator 17, locked in place by the shear pin 18 (Figure 3).

The cord 24, attached to the actuating wire of the trigger mechanism 19 of the explosive actuator 17, is shorter than the load line connection to the hook 4 or ring 14 and therefore this cord 24 is pulled when the parachute opens and the load and parachute separate to the length of their connections to each other. The pull on the cord 24 trips the trigger 19 of the "T-2" actuator 17 to release the firing pin 20, firing the primer 21 and igniting the series charges 22 which burn uniformly somewhat slowly and form a time delay before the powder train reaches the explosive charge and blows the actuator 17 out of its hole 16, shearing the shear pin 18 (Figure 3) and clearing the mouth of the hook 4.

The spring 9 impinges against the load link 14 to resiliently urge it from the hook 4, but is prevented from doing so by the pull developed between the parachute and load during descent after the "T-2" has exploded and the load is supported. The ring 14 is prevented from climbing out of the hook by the pull of the load. Upon the load contacting the ground the downward pull on the ring 14 is relieved and the spring 9 ejects the load link 14 from the hook 4 to immediately separate the parachute from its load.

Figures 4 to 7 illustrate a modified form of the invention in which like parts bear the same reference characters and similar parts in the modification are primed. The conductor body 1' instead of being provided with a blind bore 16 is formed with a through bore 16' having its lower ⅓ length counterbored as at 26'. Fitted into the through bore 16' is the upper portion of a modified version of the "T-2" actuator 17' with its lower portion extending into the counterbore 26'. This modified version of T-2 actuator is generally indicated by the numeral 17' is also of a conventional design, the only difference between the two explosive actuators 17 and 17' is in the external shape of their respective shells, the explosive actuator 17' being provided with a flange 27 located approximately ⅓ of the way from bottom to top of the actuator. The flange 27 seats against the shoulder 27' formed between the bore 16' and the counterbore 26'.

A cylindrical detent member 28, provided with a blind bore 29, telescopes over the explosive end of the explosive actuator 17' and is held in place by a screw 30 having its end seated in a small hole in the member 28 (Figure 5). The lower end of this member 28 extends across the mouth or bight 5' of the hook, the outer edge 6' of the hook 4' being provided with a groove 31' describing a circular arc, to provide clearance for the detent member 28.

In the modified design as illustrated in Figures 4 to 6, the explosive actuator 17' has its explosive charge end extending downwardly and its trigger mechanism end facing upwardly, therefore the pull cord 24' attached to the trigger wire 23' of the trigger mechanism is attached to the parachute instead of the load. The cord 24', of course, being shorter than the parachute shroud lines 3' so that it will be pulled when the parachute opens and the load and parachute separate and pull against each other.

In place of the D ring 2 a rectangular eyelet 2' is provided, in the body of the connector 1', for connection of the connector body 1' to the shroud lines 3' of a parachute (not shown).

The operation of the modfied version of the invention is the same as the version shown in Figures 1 and 2, except that the explosive actuator 17' remains in place and blows off or projects the plunger detent 28, out of the opening or bight in the mouth of the hook 41.

The embodiments of the invention shown and described are to be regarded as illustrative and exemplary rather than restrictive and it is to be understood that the invention is susceptible to variations and changes which come within the scope of the appended claims.

I claim:

1. An automatic load releasing link for releasably connecting a load conveying device to a load supporting element comprising a link having an eyelet in its upper end and a hook on its lower end, said link having an upwardly directed chamber, a mouth closing member slidable in the upwardly directed chamber and closing the mouth of said hook, ejection means biased across said hook toward the mouth thereof whereby the load supporting element when placed in the bight of the hook against the bias of said ejection means will be forced out of the hook upon removal of the mouth closing member, detent means for releasably retaining said mouth closing member in said upwardly directed chamber and across the mouth of said hook, explosive means in said chamber for ejecting said mouth closing member out of said chamber and away from said hook, time delay means for igniting said explosive means, and means for initiating the operation of said time delay means connected for operation thereof by pull in opposite directions between said load conveying device and said load supporting element.

2. An automatic load releasing link for releasably connecting a parachute to a load carrying member to be supported by said parachute comprising a link body having an eyelet in its upper end and a hook at its lower end, said body having an upwardly extending guide bore above said hook with its axis extending across the mouth of the hook, a hook closure member slidable axially out of said bore to open said hook, detent means between said body and said closure member for releasably retaining said closure member in said bore, an explosive charge in said bore for projecting said member axially out of said bore to open said hook, time delay means for igniting said explosive charge, and pull means connected to said time delay means for initiating said time delay means into operation, said pull means being responsive to a predetermined initial pull between said parachute and said load carrying member to initiate said time delay means into operation.

3. Apparatus as claimed in claim 2 in which said hook is formed with a lower article supporting surface inclined upwardly toward the mouth of the hook for supporting the load carrying member for biasing the same inwardly away from the mouth of the hook upon application of load thereon, and spring actuated load carrier ejection means carried by said link at opposite sides thereof for yieldably biasing said load carrying member up said inclined surface and out of said hook upon ejection of said closure member from said bore and a predetermined reduction of load on said load carrying member, when the load becomes supported by a supporting surface.

4. In an automatic parachute load release device, a load supporting member comprising a link member having an opening in the upper end thereof for securing the link to a parachute and a load supporting hook at its lower end for connection to a load, said link having a substantially vertical guide passage formed therein with its axis extending across the mouth of the hook, a mouth closure member removably secured in said guide passage and extending across the mouth of the hook, a time delay explosive device disposed in said guide passage for projecting said mouth closure member axially out of said guide passage away from said link to open said hook upon explosion thereof, means for initiating operation of said time delay explosive device including a pull actuated trigger axially movable in said guide passage, and yieldable spring means carried by said link member at opposite sides thereof for yieldable pushing engagement with a load supporting ring when placed in said hook for yieldably forcing said ring out of said hook upon the projection of said mouth closure member out of said guide passage and a predetermined reduction in application of downward pull on said ring.

5. In an automatic parachute release device for connecting a load carrying member to the shroud lines of a parachute comprising a link body having an eye in the top thereof for connection to said shroud lines, said body having a hook in the lower portion thereof for receiving a ring attached to a load to be supported by said parachute, said hook having its lower supporting surface inclining upwardly toward the mouth of the hook to bias said ring inwardly away from said mouth upon application of downward pull on said ring by said load, said body having a cylindrical guide bore formed therein above said hook with its axis extending across the mouth of the hook, a cylindrical mouth closure member removably seated in said guide bore and extending across the mouth of the hook to retain said ring in said hook, detent means between said body and said closure member retaining the closure member in said bore, time delay projection means disposed in said bore for projecting said mouth closure member axially out of said bore to open the mouth of said hook, a pull trigger connected for initiating the operation of said time delay projection means, and spring biasing means carried by said body having means for yieldably biasing said ring out of the mouth of said hook upon projection of said mouth closure member out of said guide bore and a predetermined reduction of the application of load on said ring.

6. In an automatic parachute load release device, for connecting a load carrying member to the shroud lines of a parachute comprising a link body having a means in the top thereof for connection to said shroud lines, said body having a hook in the lower portion thereof for receiving a ring attached to a load to be supported by said parachute, said hook having its lower supporting surface inclined upwardly toward the mouth of the hook to bias said ring inwardly away from said mouth upon application of downward pull on said ring by said load, said body having a cylindrical guide bore formed therein above said hook with the axis thereof extending across the mouth of said hook, said bore being concentrically counterbored at its lower portion to provide an enlarged cylindrical guide opening, a cylindrical mouth closure member slidably seated in said counterbore and projecting across said hook opening to close said hook opening, shearable locking means between said body and said cylindrical mouth closure member for retaining the same in said counterbore, said cylindrical mouth closure member having a concentric cylindrical recess formed in the upper end thereof in communication with said bore, a cylindrical time delay explosive actuator fixed in said cylindrical bore having its lower end containing an explosive charge and seated in said concentric cylindrical recess in said mouth closure member, a series of slow burning powder charges in said explosive actuator above said explosive charge for igniting said explosive charge to blow said mouth closure member out of said counterbore and away from the mouth of said hook, and trigger means in said actuator above said powder charges for igniting the same, said trigger means including an actuating pull means connecting said trigger means to the supporting parachute to be pulled thereby to actuate said trigger means upon deployment of the parachute.

References Cited in the file of this patent
UNITED STATES PATENTS

| | | |
|---|---|---|
| 2,488,537 | Hattan | Nov. 22, 1949 |
| 2,489,984 | Shoemaker | Nov. 29, 1949 |
| 2,490,558 | Sullivan | Dec. 6, 1949 |
| 2,616,748 | Hight | Nov. 4, 1952 |